(12) United States Patent
Tirkkonen et al.

(10) Patent No.: US 11,044,596 B2
(45) Date of Patent: Jun. 22, 2021

(54) FAST DEVICE DISCOVERY

(71) Applicant: NOKIA SOLUTIONS AND NETWORKS OY, Espoo (FI)

(72) Inventors: Olav Tirkkonen, Helsinki (FI); Zexian Li, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 198 days.

(21) Appl. No.: 16/069,867

(22) PCT Filed: Jan. 13, 2016

(86) PCT No.: PCT/EP2016/050541
§ 371 (c)(1),
(2) Date: Jul. 13, 2018

(87) PCT Pub. No.: WO2017/121469
PCT Pub. Date: Jul. 20, 2017

(65) Prior Publication Data
US 2020/0228957 A1 Jul. 16, 2020

(51) Int. Cl.
*H04W 8/00* (2009.01)
*H04W 28/26* (2009.01)
*H04W 72/04* (2009.01)

(52) U.S. Cl.
CPC .......... *H04W 8/005* (2013.01); *H04W 28/26* (2013.01); *H04W 72/0433* (2013.01)

(58) Field of Classification Search
None
See application file for complete search history.

(56) References Cited

U.S. PATENT DOCUMENTS 9,609,502 B2 * 3/2017 Xiong ................... H04W 8/005
2007/0168554 A1 * 7/2007 Dinger .................... H04L 41/12
709/245

(Continued)

FOREIGN PATENT DOCUMENTS

| WO | 2014113537 A1 | 7/2014 |
| WO | 2014154256 A1 | 10/2014 |
| WO | 2014180283 A1 | 11/2014 |

OTHER PUBLICATIONS

International Search Report and Written Opinion for International Application No. PCT/PCT/EP2016/050541, dated Sep. 19, 2016 (15 pages).

(Continued)

*Primary Examiner* — Eunsook Choi
(74) *Attorney, Agent, or Firm* — Brake Hughes Bellermann LLP

(57) ABSTRACT

There is provided a method in a network element of a radio communication network, the method comprising: grouping, by the network element, a plurality of discovery patterns into at least two groups, wherein each discovery pattern comprises one or more discovery slots on radio resources for detecting discovery signals by a network node; associating at least one of the groups with a first spatial parameter and at least one other group with a second spatial parameter; and transmitting configuration information enabling a network node to utilize a discovery pattern belonging to a group associated with a spatial parameter that corresponds to spatial information of the network node.

20 Claims, 7 Drawing Sheets

(56) References Cited

U.S. PATENT DOCUMENTS

| | | | | |
|---|---|---|---|---|
| 2013/0051277 A1* | 2/2013 | Hakola | ................ | H04W 76/14 |
| | | | | 370/254 |
| 2015/0382315 A1* | 12/2015 | Sorrentino | .......... | H04W 56/002 |
| | | | | 370/329 |
| 2016/0100355 A1* | 4/2016 | Chen | .................... | H04W 48/16 |
| | | | | 370/232 |
| 2016/0192416 A1* | 6/2016 | Nagata | ................ | H04W 8/005 |
| | | | | 370/329 |
| 2016/0269887 A1* | 9/2016 | Kim | .................... | H04W 8/005 |

OTHER PUBLICATIONS

Office Action for European Application No. 16700451.4, dated Apr. 30, 2020, 8 pages.

Office Action for European Patent Application No. 16700451.4, dated Oct. 12, 2020, 6 pages.

* cited by examiner

FAST DEVICE DISCOVERY

CROSS-REFERENCE TO RELATED APPLICATIONS

This application is a national stage entry of PCT Application No. PCT/EP2016/050541 filed Jan. 13, 2016, entitled "FAST DEVICE DISCOVERY" which is hereby incorporated by reference in its entirety.

TECHNICAL FIELD

The invention relates to communications.

BACKGROUND

In communications, devices may transmit discovery signals enabling devices to detect each other. It may be beneficial to provide solutions enhancing flexibility of the discovery signal transmission and detection.

BRIEF DESCRIPTION

According to an aspect, there is provided the subject matter of the independent claims. Some embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following embodiments will be described in greater detail with reference to the attached drawings, in which.

DETAILED DESCRIPTION OF SOME EMBODIMENTS

Figure 1A:
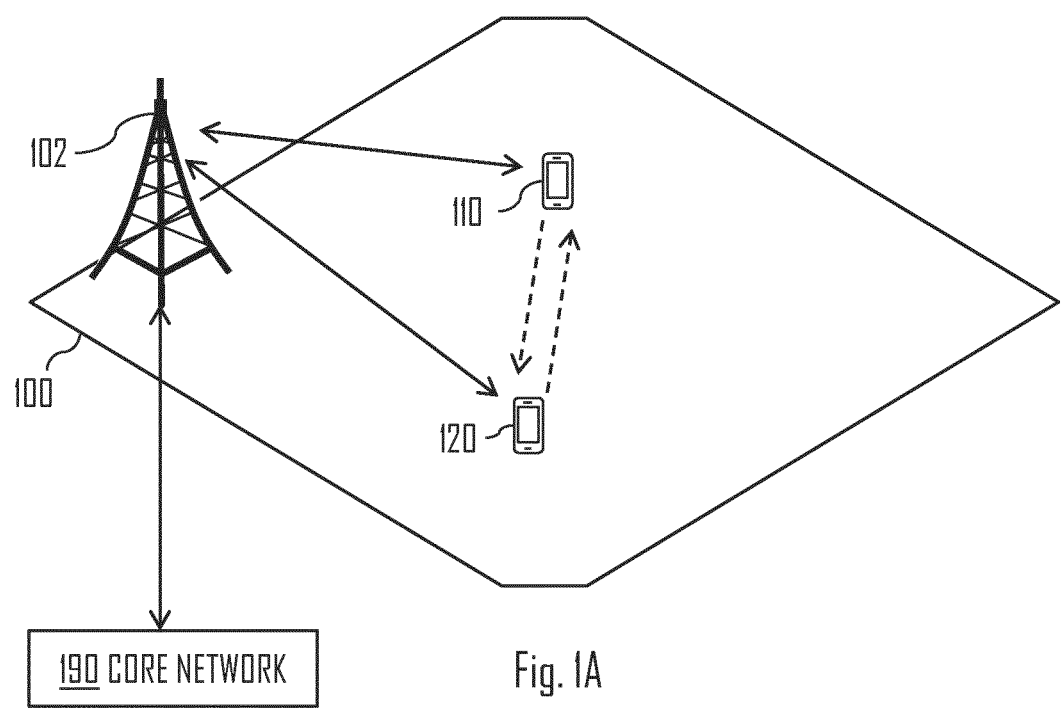
FIG. 1A illustrates an example radio communication system to which embodiments of the invention may be applied.

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Embodiments described may be implemented in a radio communication system, such as in at least one of the following: Worldwide Interoperability for Micro-wave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), Long Term Evolution (LTE), LTE-Advanced (LTE-A), and/or LTE-Advanced Pro.

The embodiments are not, however, restricted to the system given as an example but a person skilled in the art may apply the solution to other communication systems provided with necessary properties. Another example of a suitable communications system is the 5G concept. 5G is likely to use multiple input—multiple output (MIMO) techniques (including MIMO antennas), many more base stations or nodes than the LTE (a so-called small cell concept), including macro sites operating in co-operation with smaller stations and perhaps also employing a variety of radio technologies for better coverage and enhanced data rates. 5G will likely be comprised of more than one radio access technology (RAT), each optimized for certain use cases and/or spectrum. 5G mobile communications will have a wider range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, below 6 GHz—cmWave—mmWave). One of the concepts considered to be used in 5G networks is network slicing in which multiple independent and dedicated virtual sub-networks (network instances) may be created within the same infrastructure to run services that have different requirements on latency, reliability, throughput and mobility. It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or cloud data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent. Some other technology advancements probably to be used are Software-Defined Networking (SDN), Big Data, and all-IP, which may change the way networks are being constructed and managed.

FIG. 1A illustrates an example of a radio communication system to which some embodiments may be applied. The radio communication system may comprise a cellular communication system. Cellular communication networks, such as the Long Term Evolution (LTE), the LTE-Advanced (LTE-A), the LTE-Advanced Pro of the 3rd Generation Partnership Project (3GPP), or the predicted future 5G solutions, are typically composed of at least one network element, such as a network element 102, providing a cell 100. The cell 100 may be, e.g., a macro cell, a micro cell, femto, or a pico-cell, for example. The network element 102 may be an evolved Node B (eNB) as in the LTE and LTE-A, a radio network controller (RNC) as in the UMTS, a base station controller (BSC) as in the GSM/GERAN, or any other apparatus capable of controlling radio communication and managing radio resources within the cell 100. For 5G solutions, the implementation may be similar to LTE-A, as described above. The network element 102 may be a base station or an access node, for example.

The radio communication system may be composed of a radio access network of network nodes or elements similar to the network element 102, each network node or element controlling a respective cell or cells. For example, the radio communication system may comprise a plurality of network elements providing cells and service for a certain area. The network elements may be connected to each other such that data transfer between the network elements is possible. For example, X2-interface between eNBs may be utilized, but other solutions are also possible (e.g. wireless data transfer).

The network element 102, as any other network elements of the system, may be connected via a core network interface to a core network 190 of the cellular communication system. In an embodiment, the core network 190 may be called Evolved Packet Core (EPC) according to the LTE terminology. The core network 190 may comprise a mobility management entity (MME) and a data routing network element. In the context of the LTE, the MME may track mobility of terminal devices 110, 120, and carries out establishment of bearer services between the terminal devices 110, 120 and the core network 190. In the context of the LTE, the data routing network element may be called a System Architecture Evolution Gateway (SAE-GW). It may be configured to carry out packet routing to/from the terminal devices 110, 120 from/to other parts of the cellular communication system and to other systems or networks, e.g. the Internet.

In an embodiment, the network element 102 is and/or comprises a central unit of a Vehicle-To-Vehicle (V2V) communication system. That is, the radio communication system may be and/or comprise the V2V communication system. In some embodiments, the radio communication system may further comprise an Intelligent Transportation System (ITS) communication system. Therefore, it may be understood that the described radio communication system may comprise a cellular communication system (e.g. LTE, 5G) and the ITS communication system. However, it may not be necessary that these systems are separate, and may thus be integrated into one system having the functions which are suitable for each use case. To further explain the situation, the network element 102 may, for example, provide a cellular service for one or more terminal devices. Further, it may act as (or comprise) a central unit for V2V communication system. Thus, it may provide resources for discovery signal transmission and/or detection, for example.

It needs to be noted that although the terminal devices 110, 120 are introduced as a group, it may be possible that there is only one terminal device 110 in the cell. That is, it is not necessary for the system that there is a plurality of terminal devices. On the other hand, the system introduced in FIG. 1A may support plurality of terminal devices. The terminal devices 110, 120 may comprise, for example, cell phones, smart phones, tablets, and/or vehicles for example.

It may also be possible that the radio communication system of FIG. 1A supports Machine Type Communication (MTC). Example of this may be the V2V communication system and devices comprised in such system. MTC may enable providing service for a large amount of MTC capable devices. Such communication may increase the load of the radio communication network and thus solutions to enhance such communication may be beneficial.

The at least one terminal device 110, 120 may comprise mobile phones, smart phones, tablet computers, laptops and other devices used for user communication with the radio communication network (e.g. communication with the cellular communication network). These devices may provide further functionality compared to the MTC schema, such as communication link for voice, video and/or data transfer. However, it needs to be understood that the at least one terminal device 110, 120 may also comprise MTC capable devices, such as sensor devices providing position, acceleration and/or temperature information; or integrated vehicle devices (e.g. vehicle computer or just vehicles), to name a few examples.

In an embodiment, the radio communication system supports Device-to-Device (D2D) communication. This may mean that the terminal devices 110, 120 may be able to directly communicate with each other. This may be in addition to that of transmitting (e.g. broadcasting) or detecting discovery signal(s). D2D communication may be used, for example, to offload the network.

The radio communication system may support Carrier Aggregation (CA). CA may enable increasing usable bandwidth between the terminal devices and network elements of the radio communication system. For example, in the 3GPP, CA may be used for LTE-A in order to support wider transmission bandwidths enhancing increased potential peak data rates to meet LTE-A requirements. For example, more than one component carriers may be aggregated contiguously and/or non-contiguously to provide a wider bandwidth. In uplink carrier aggregation, multiple uplink component carriers may be aggregated and can be allocated in a subframe to a terminal device. Further, the radio communication system may support intra-band CA with contiguous and/or non-contiguous resource allocation. The radio communication system may also support inter-band CA enabling non-contiguous resource allocation from more than one radio band.

The radio communication system may support Dual Connectivity (DC). Naturally, in order to use DC, the at least one terminal device 110, 120 may also need to support DC. The DC may be a radio communication system feature, wherein the at least one terminal device 110, 120 may simultaneously receive from and/or may simultaneously transmit to at least two network points. Similarly, the radio communication system of FIG. 1A may support Multiple-Input and Multiple-Output (MIMO). Thus, the network elements and/or the terminal devices of the radio communication system may comprise more than one antenna for data transfer. For example, the network element 102 may be a primary network element (e.g. Primary eNB) providing a Primary Cell (PCell) and at least one at least one other network element or node may be a secondary network element (e.g. Secondary eNB) and/or a primary secondary network element (e.g. Primary Secondary eNB) providing a Secondary Cell (SCell) and/or Primary Secondary Cell (PSCell).

It may be possible that the radio communication system shown in FIG. 1A supports Licensed-Assisted Access (LAA) which relates to using unlicensed radio band(s) for data transfer. For example, the network element 102 and/or the second network element may provide one or more unlicensed cells in order to increase data transfer capability on the radio communication system. For example, the network element 102 may allocate radio resources of the one or more unlicensed cell for the at least one terminal device 110, 120 through CA, thus increasing the data transfer between the at least one terminal device 110, 120 and the network element(s).

Still referring to FIG. 1A, the terminal devices 110, 120 may communicate with the network element 102 and/or some other network elements as shown with arrows. The arrows may refer to bidirectional communication and/or unidirectional communication. That is, the network element 102 may, for example, broadcast data within the cell 100 (e.g. whole cell or subpart of the cell). The broadcasted data may be detected and received by the terminal devices 110, 120. Similarly, the system may support unicast. That is, for example, the terminal devices 110, 120 may be in communication with the network element 102 using a bidirectional communication. In some embodiments the system supports multicast.

The terminal devices 110, 120 may be able to transmit to and/or receive data from the network element 102 by using one or more communication methods as described above. Thus, for example, the network element 102 may control radio resources used, by the terminal devices 110, 120, for transmitting and/or detecting discovery signal(s). The network element 102 may communicate these radio resources to the terminal device 110, 120, for example.

As shown with dotted arrows in FIG. 1A, the terminal devices 110, 120 may transmit (e.g. broadcast) discovery signal(s) enabling other devices to detect them. Thus, for example, the second terminal device 120 may be able to detect the discovery signal transmitted by the first terminal device 110, and vice versa.

Figure 1B:
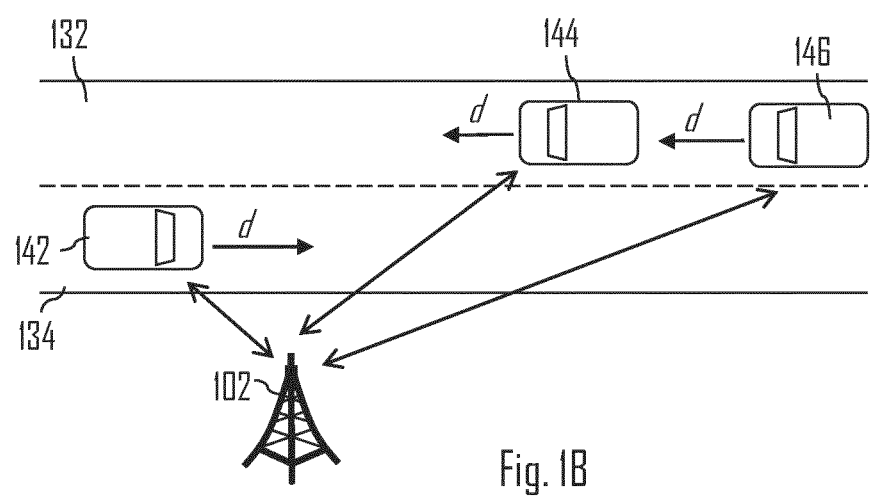
FIG. 1B illustrates an example radio communication system to which embodiments of the invention may be applied.

FIG. 1B illustrates an example system to which embodiments of the invention may be applied. The system of FIG. 1B may be similar with the system of FIG. 1A. Referring to FIG. 1B, a road with a first lane 132 and a second lane 134 may be illustrated. The system may comprise one or more vehicles 142-146 having communication capability. The vehicles 142-146 may comprise communication circuitry or an integrated device enabling the communication. Also, it may be possible that a terminal device (e.g. a mobile phone) is used in combination with a vehicle such that the terminal device is connected (wirelessly or by wire) with the vehicle, wherein the terminal device may provide the discovery signal functionality to the vehicle. To simplify the description, let us consider the vehicles (e.g. cars, motorcycles, and lorries, to name a few) 142-146 as network nodes capable of communicating with other network nodes (e.g. other vehicles) and with one or more radio communication networks. Said network nodes 142-146 may have a direction of movement which is indicate in FIG. 1B with arrows d. Further, each network node may have a speed and a location. Further, each network node 142-146 may be within one or more areas. Naturally, location may be dependent on direction and speed of movement. Further, location may determine whether or not a network node is within certain area.

Even further, arrows drawn between the network element 102 and the network nodes 142-146 may illustrate the same function as the arrows drawn between the terminal devices 110, 120 and the network element 102 in FIG. 1A.

It has been envisioned that the next generation of wireless communication systems, such as 5G, may enable new services in different verticals due to the capability to support low latency and high reliable communications. One target of 5G, for example, may be to enable autonomous driving, while the current V2V communication may be mainly for the purpose of driving assistance. Further, reliable multicast has been seen as one of the technical enablers for the future V2V communication. In order to support reliable multicast, vehicles (or network nodes 142-146 as described) may need to have the capability of discovering each other in a fast and reliable way. Reliable discovery may also enable the reliable unicast communication between vehicles.

Autonomous driving may require that the network nodes 142-146 may be able to detect each other in reliable and fast manner. The requirement may be different between different network nodes. For example, it may be important to detect vehicles that are not visible (e.g. behind a hill or a corner).

Considering the FIG. 1B as an example scenario, the third network node 146 is about to overtake the second network node 144. Such scenario may be rather common when driving. Further, the first network node 142 may be moving closer to the second and third network nodes 144-146. Obviously, the third and first network nodes 146, 142 may collide with each other if they are both using the second lane 134 simultaneously. As explained above, the network nodes here may refer to the communication capabilities of the vehicles that are actually used for the driving operation.

Further, considering the autonomous driving scenario the network node 146 should inform the network nodes 142, 144 about its intention to overtake the network node 144. These three network nodes may form a group for reliable communications. In this case, multicast may be an effective scheme to support communication within this group. The reason may be to avoid setting up multiple unicast links (with potential increased latency, lower spectral efficiency and increased complexity) and blind broadcast (no feedback making the reliable communication more challenging).

In order to have a better support of multicast in the group, the network node 146 may need to be able to discover relevant network nodes quickly. In the example case shown in FIG. 1B, the network nodes might be visible to each other, but there may also be cases where multicast is needed, but the network nodes 142-146 are not visible to each other, except in a radio domain. The problem may thus be how to enhance discovery of other devices over radio in a V2V network, especially considering the network nodes 142-146 may be operated in half-duplex mode (i.e. with no simultaneously transmission and reception on the same carrier). There is provided a solution to enhance the discovery schema. The solution may be used in the V2V communication system, but also in other communication systems. That is, the solution is not restricted to be used only with vehicles or with V2V communication system. However, the examples set forth below may more or less be involved with vehicles.

Figure 2:
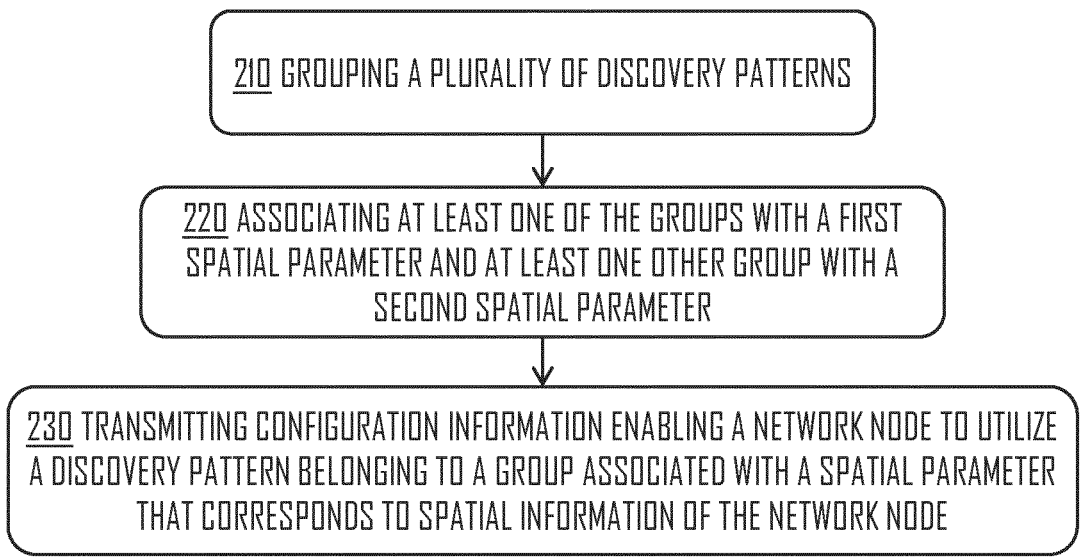
FIG. 2 illustrates a flow diagram according to an embodiment.

FIG. 2 illustrates a flow diagram according to an embodiment. Referring to FIG. 2, in step 210, a network element of a radio communication network may group a plurality of discovery patterns into at least two groups, wherein each discovery pattern comprises one or more discovery slots on radio resources for detecting discovery signals by a network node. In step 220, the network element may associate at least one of the groups with a first spatial parameter and at least one other group with a second spatial parameter. In step 230, the network element may transmit configuration information enabling a network node to utilize a discovery pattern belonging to a group associated with a spatial parameter that corresponds to spatial information of the network node.

The network element performing the steps of FIG. 2 may be, for example, the network element 102 or one or more circuitries comprised in the network element 102. For example, said network element may be or be comprised in a central unit of a V2V communication network. As explained, the V2V and/or cellular communication capabilities may be comprised in the same network element, for example.

Figure 3:
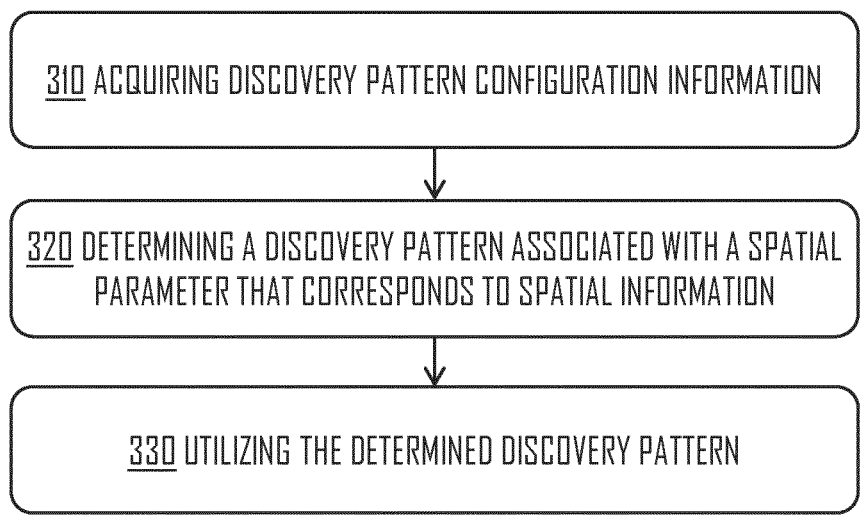
FIG. 3 illustrates a flow diagram according to an embodiment.

FIG. 3 illustrates a flow diagram according to an embodiment. Referring to FIG. 3, in step 310, a network node may acquire discovery pattern configuration information. In step 320, the network node may determine, at least partly on the basis of the acquired configuration information, a discovery pattern associated with a spatial parameter that corresponds to spatial information of the network node. In step 330, the network node may utilize the determined discovery pattern. This may mean that the network node may, for example, detect discovery signal(s) and/or transmit discovery signal(s), as explained in below in greater detail. In short, the utilization may mean that the network node transmits at least one discovery signal on radio resources defined by the discovery pattern and/or detects one or more discovery signals, on radio resources defined by the discovery pattern, transmitted by other network node(s). Thus, as explained below, the discovery pattern may comprise radio resources for receiving (i.e. detecting) and/or transmitting discovery signal(s).

The network node performing the steps of FIG. 3 may be, for example, one of the network nodes 142, 144, 146 or one or more circuitries comprised in one of the network nodes 142, 144, 146. Similarly, said network node may be and/or be comprised in one of the terminal devices 110, 120. Thus, for example, any user equipment (UE) capable of communication with a radio communication network (e.g. cellular communication network and/or V2V communication network) may be configured to perform the steps of FIG. 3.

In an embodiment, the network element 102 allocates two or more discovery patterns to a single network node. The two or more discovery patterns may belong to the same or different groups.

Figure 4A:
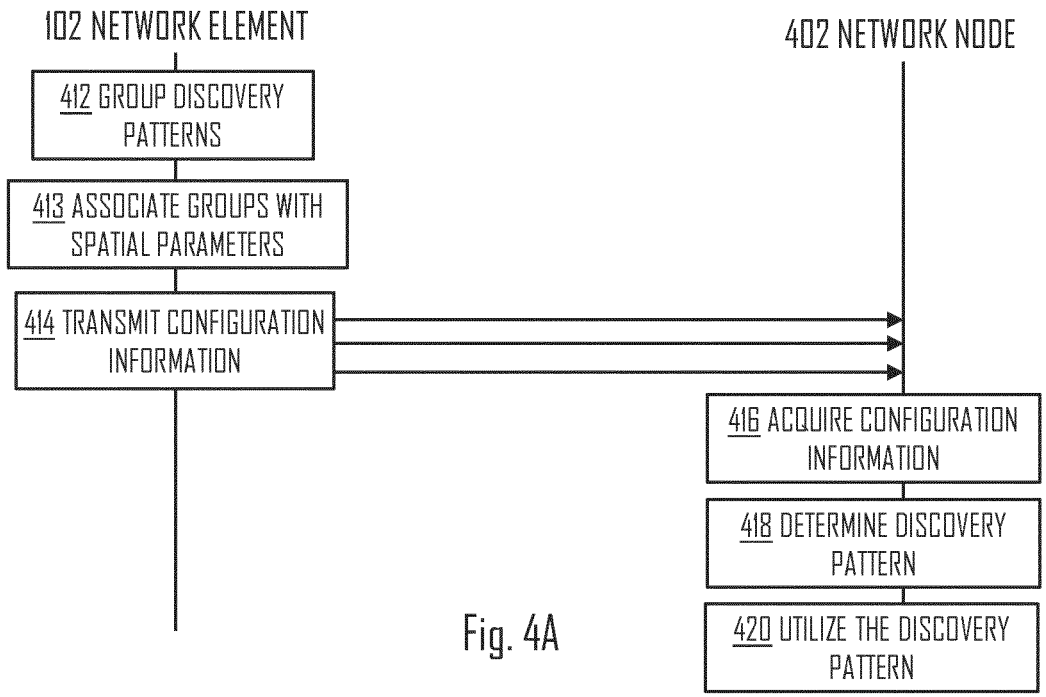
FIGS. 4A to 4B illustrate some embodiments.
Figure 4B:
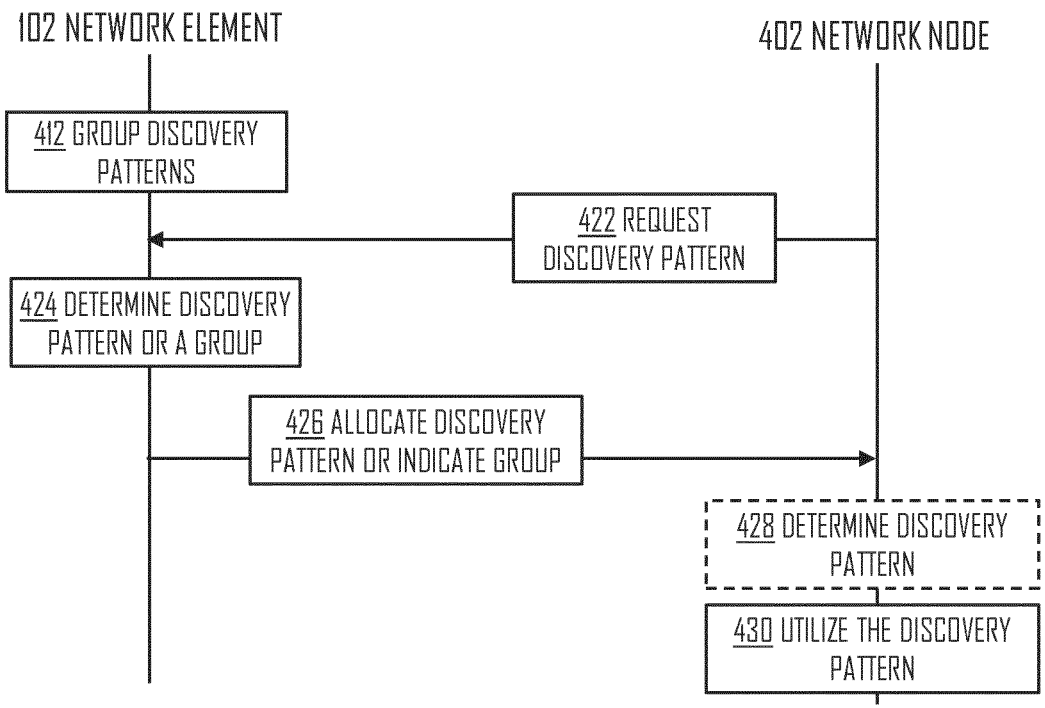

FIGS. 4A to 4B illustrate signal diagrams according to some embodiments. Referring to FIG. 4A, a network node 402 may be and/or comprise the network node performing the steps of FIG. 3, for example. As a reminder, the network node 402 may thus be, for example, a terminal device, such as a mobile phone or a vehicle terminal device. Now, as indicated with reference to FIG. 2, the network element 102 may group a plurality of discovery patterns into groups, i.e. two or more groups (block 412). Let us now consider, in general, what a discovery pattern may be.

A discovery pattern may be used by a network node, such as the network node 402, to detect and/or transmits discovery signal(s). Transmitting a discovery signal by a network node may enable other network nodes to detect the transmitted signal, and thus discover other network nodes. Thus, the discovery pattern may comprise (or define) radio resources (in terms of for example time, frequency, code etc.) for the transmission and/or for the detection. The discovery pattern may be periodic meaning that certain radio resources (e.g. for transmission of the discovery signal) may repeat with regular intervals, or the discovery pattern may be aperiodic and thus based on some pseudorandom pattern (e.g. intervals may be irregular).

To give an example, the discovery pattern may define two slots for detecting discovery signals that are transmitted by other network nodes. Period between the two slots may be used to transmit discovery signal. For example, discovery signal may be transmitted (e.g. broadcasted) at least once on given radio resources (e.g. the same frequency area or band that is used for the detection). Similarly, the period between the two slots may be used to communicate with the network element 102 and/or with other network nodes (e.g. D2D communication).

Referring to FIG. 4A, in block 413, the network element 102 may associate the groups with a plurality of spatial parameters. For example, if there are two groups, each group may be associated with a different spatial parameter. In another example, both groups may be associated with the same spatial parameter. For example, if there are three groups, two of the groups may be associated with one spatial parameter, and one other group may be associated with a second spatial parameter. On the other hand, for example, if there are four groups, each group may be associated with a different spatial parameter. Thus, there may be many different ways on how to associate the groups with the spatial parameters.

The spatial parameters may comprise a geographical area, network node location, and/or network node moving direction. Also, the spatial parameters may comprise network node speed. For example, a spatial parameter may be a combination of network node location and moving direction. Other combinations may also be possible. Using FIG. 1B as an example, one spatial parameter may be direction of movement. This means that is FIG. 1B, there may be at least two spatial parameters for the moving direction (e.g. one left and one right). It needs to be understood that if there is a curve in the road, the moving direction may mean the overall moving direction (e.g. one direction being from A to B, the other being from B to A). Intersections, for example, may provide more moving directions. Further, as said, the location or area may be used as a spatial parameter. In the example of FIG. 1B, one area may be the first lane 132, and another may be the second lane 134. Location may determine whether a network element is within the area, for example. For example, a geographical area may refer to a road or to one or more lanes. For example, if a network node is on a certain lane (i.e. certain geographical area), the network node location may be within that certain lane. That is, the network node location may correspond to one or more geographical areas. Further, the network element 102 may be able to determine or estimate, based on current location of a network node and moving direction and/or speed, in which geographical area the network node will be after some time period. Thus, estimations about location may be also made and thus discovery patterns may be given based on such estimation(s).

Similarly, the spatial information may comprise similar and/or the same values as the spatial parameter. For example, network node's spatial information may indicate a location and/or speed, although other values may also be possible. For example, the location may correspond to some spatial parameter (e.g. geographical area). This is just an example however, and thus it needs to be understood that spatial information, as explained herein, may be compared to the spatial parameter(s) of the groups.

Further, as described, combination of the described parameters may be used in determining a spatial parameter. For example, if there are two lanes going to same direction, the moving direction may be combined with the area or location to have two spatial parameters for network nodes moving to the same direction. That is, the discovery patterns or groups may be moving direction specific, lane specific, road specific, and/or road subpart-specific, just to name a few examples. Thus, in the example of FIG. 1B, one or more groups may be associated with the first lane 132. One or more further groups may be associated with the second lane 134, for example. Similar group association schema may be achieved, in the example FIG. 1B, by associating the groups based on possible moving directions of network nodes, such as the network nodes 142, 144, 146.

In block 414, the network element 102 may transmit configuration information enabling network nodes to utilize a discovery pattern belonging to a group associated with a spatial parameter that corresponds to spatial information of the network nodes. That is, the configuration information may be acquired by one or more network nodes, wherein each network node may determine a discovery pattern that it should utilize. The utilized discovery pattern may be different between network nodes, i.e. a first network node may utilize a first discovery pattern whereas a second network node may utilize a second discovery pattern. In an embodiment, the transmitting comprises at least one of broadcasting, multicasting, and/or unicasting the configuration information to one or more network nodes. In an embodiment, the network element 102 broadcasts the configuration information. This may be beneficial to enhance the use of radio resources. Further, in such case there may not be a need to first establish a connection to a network node before transmitting the configuration information. In step 416, the network node 402 may acquire the configuration information. Acquiring may, for example, mean that said information is directly received from the network element 102 and/or it may be received via another network element, for example. In an embodiment, at least some of the configuration information is stored in the network node 402.

In step 418, the network node 402 may determine, based at least partly on the configuration information, the discovery pattern that the network node 402 may utilize in step 420. The determined discovery pattern may be associated with a spatial parameter that corresponds to spatial information of the network node 402. The spatial information of a network node may comprise a similar spatial parameter as described above. For example, the network node 402 may be aware of its moving direction, location, or road lane on which it is on. The configuration information may comprise information about the groups of discovery patterns associated with spatial parameters. Therefore, the network node may, for example, determine that it is on a lane that is associated with a certain group and select and utilize a discovery pattern from that associated group.

In an embodiment, the network node 402 fetches the configuration information from a server or some other network location. That is, the transmitted configuration information, by the network element 102 (e.g. broadcasting), may be not be necessary. Such solution may work in scenarios where the network node 402 is not within network service, for example. For example, the configuration information may be stored into the network node's memory or acquired from navigation system.

Referring to FIG. 4B, That is, the network node 402 may, in block 422, transmit, to the network element 102 of the radio communication network, a message requesting radio resources for discovery signal transmission and/or receiving. In an embodiment, the message comprises and/or indicates spatial information of the network node 402. The network node 402 may, as a response to the transmitting of said message, receive the configuration information from the network element 102. In an embodiment, the configuration information comprises allocation of a discovery pattern to the network node 402 (e.g. as in step 426). Thus, the network element 102 may not necessarily have to broadcast the configuration information. That is, the network element 102 may transmit the configuration information (step 426) as a response to receiving the message from the network node transmitted in step 422.

As described, the network element 102 may receive, from the network node 402, the message requesting radio resources for discovery signal transmission and/or receiving (transmitted in step 422). In step 424, the network element 102 may determine, based on the received message, a group associated with a spatial parameter that corresponds to spatial information of the network node 402. This may mean that the association of the groups with spatial parameters may already be performed or that the association is performed, at least partially, after the request is received from the network node 402.

In an embodiment, the transmitting the configuration information, by the network element 102, comprises allocating a discovery pattern of the determined group to the network node 402. In an embodiment, the network element 102 determines the discovery pattern that it allocates to the network node 402. Thus, it may not necessarily first determine the group if the discovery pattern is associated with a certain spatial parameter.

In an embodiment, the configuration information comprises an allocation of a discovery pattern or an indication of a group. That is, the network element 102 may determine the group, as in step 424, based on the spatial information of the network node 402 (e.g. spatial parameter associated with the group compared with the spatial information of the network node 402). In an embodiment, the network element 102 may indicate only the group to the network node 402, wherein the network node 402 may, in step 428, determine a discovery pattern from that indicated group and utilize it (step 430). However, if the network element 102 allocates the discovery pattern directly, the network node 402 may receive the allocation and utilize it (step 430) without further determination of step 428.

In an embodiment, the configuration information, received by the network node 402, comprises an indication of a group among a plurality of discovery pattern groups, wherein the determining, by the network node 402, the discovery pattern comprises selecting the discovery pattern belonging to the indicated group.

In an embodiment, the network element 102 receives respectively from a first and a second network nodes a message requesting radio resources for discovery signal transmission and/or receiving. The network element may further determine, based on the received messages, that a spatial information of the first network node corresponds to the first spatial parameter and that a spatial information of the second network node corresponds to the second spatial parameter, wherein the transmitting the configuration information (e.g. as in step 426) comprises allocating a discovery pattern of a group associated with the first spatial parameter to the first network node, and allocating a discovery pattern of another group associated with the second spatial parameter to the second network node. Similar situation may happen in the example of FIG. 4A, wherein more than one network elements may receive the broadcasted data and determine the discovery patterns to be used based on the broadcasted data (i.e. configuration information) and the spatial information of the network node.

In an embodiment, the message transmitted by the network node 402 (e.g. as in step 422) requesting radio resources for discovery signal transmission and/or receiving further indicates spatial information of the network node 402. In some embodiments, the network element 102 may determine necessary spatial information of the network node 402 based on the received signal. For example, RSSI value may be used to determine distance between a reference point (e.g. the network element 102) and the network node 402. This information may be further used to determine, for example, location of the network node 402.

In an embodiment, the message of step 422 is referred to as a discovery pattern request message. This may mean that the network node 402 requests discovery pattern or an indication of a group of discovery patterns from the network (e.g. from the network element 102).

In an embodiment, the network element 102 is configured to broadcast the configuration information as described in relation to FIG. 4A. However, it may be possible that the network node 402 or some other network node requests the discovery pattern (step 422) regardless. For example, the network node 402 may not be able to receive the broadcasted information. In another example, the broadcasted information may be outdated or wrong for the network node 402. Such may be possible, for example, on edge areas of cells (e.g. edge area of services from two or more central units).

In an embodiment, the network node 402 may further determine, based on the configuration information and the spatial information of the network node 402, a discovery pattern group associated with a spatial parameter that corresponds to the spatial information of the network node 402; and select and utilize a discovery pattern belonging to the determined group. That is, the network node 402 may receive the configuration information form the network element 102. Further, the network node 402 may become aware of its spatial information (e.g. lane, location, moving direction). Utilizing such information may enable the network node 402 to determine the discovery pattern to be used. For example, satellite positioning signals may be used to determine spatial information. Further, for example, the network node 402 may receive some information form the network element 102 or some other network location (e.g. server) which may indicate, for example, lane structure of the road. Thus, using the satellite positioning data (e.g. GPS) the network node 402 may determine current lane, for example.

The utilization of the discovery pattern by the network node 402 or some other network node (e.g. in step 420 or 430) may be referred to as fast discovery. This may be enabled by distributing or grouping the discovery patterns such that network nodes having the patters from the same group it may take a longer time to discover each other, e.g. due to possible overlap in time resources meaning that the discovery slots of different discovery patterns of same group are at least partially overlapping, while network nodes from different groups may discover each other in a faster manner, e.g. discovery slots are designed such that they are at least partially not overlapping between groups.

For example, discovery patterns from different groups may be allocated to vehicles moving to different directions (i.e. approaching each other) to enable the faster discovery. For example, in the example of FIG. 1B, it may be that discovery patterns from the same group are given to nodes 144, 146, whereas a discovery pattern from a different group is given to the node 142. Thus, the discovery between nodes 144, 146 may be slower, but the discovery between nodes 142, 144, and nodes 142, 146 may be consequently faster.

As explained above, the network element 102 (e.g. central unit) may directly allocate the discovery pattern to different vehicles, using wireless communication to the connected network node. To enable this, the network element 102 may combine information of navigation system, road structure (e.g. how many lanes, direction of lanes), and location information. For example, the network nodes may indicate their location and/or navigation system information when requesting the discovery pattern (e.g. step 422 of FIG. 4B).

As another example, the discovery pattern(s) or groups may be street specific within a certain geographical area. Network nodes may select the discovery pattern based on e.g. the position and the moving direction. The configuration information can be obtained from network elements (e.g. network element 102) or from a server (e.g. Internet server, cloud server), and potentially temporarily stored in the network node 402.

Before we take a closer look on how the discovery patterns may designed and grouped, let us consider some further aspects of the discovery pattern utilization and communication. For example, when the network node 402 acquires a new discovery pattern from the network element 102, there may be a deadline for an update, the acquired pattern being valid for e.g. a specific time duration, and/or for as long as the network node 402 stays on a road/lane, etc. If the deadline for discovery pattern update is passed, the network node 402 may add a flag to its broadcast/multicast/unicast messages indicating that it has outdated discovery information. Before receiving a further new discovery pattern, the network node may have to be more careful in driving, and may use, for example, more resources for discovery as discovery may thus be based on outdated information. There may be a particular reserved discovery pattern that network nodes, knowing that their acquired discovery patterns are outdated, may use.

In an embodiment, the network node 402 determines that the discovery pattern is outdated; and as a response, performs a predetermined action. The determination about the outdated discovery pattern may happen before or after the utilizing the discovery pattern. Thus, for example, when the network node 402 determines that the discovery pattern is outdated, it may request a new one from the network element 102. In another example, the network element 102 may use the discovery pattern for a certain time period or within certain area. After the certain time period or when moving out of said area, the network node 402 may determine that the discovery pattern is outdated. The network node 402 may then, for example, request a new discovery pattern or, as above, indicate that it is using outdated discovery information.

When the discovery patterns (also referred to as Tx/Rx patterns) are selected based on a geographical area, the configuration information may temporarily be stored in a network node and may be updated in an event-based and/or periodic manner.

In an embodiment, the network element 102 transmits the configuration information, wherein the transmission is triggered based on one or more determined events. The event(s) may be determined or trigged by the network element 102 and/or the network node(s). Let us consider the event-based implementation further:

1. The network element 102 or a server may proactively contact a network node that has a version of the discovery pattern file for a geographic area, whenever the discovery patterns within that area are changed. When distributing new discovery pattern files, there may be a date after which the new patterns are used.

2. The network node (e.g. the network node 402) may contact the network element 102 or the server whenever it is approaching a geographic area not covered by the discovery pattern files currently stored in the network node, e.g. when approaching the boundary of two countries or when driving in to a harbor where vehicles (and consequently the network nodes) are shipped to/from another discovery pattern area.

3. The network nodes may add identifiers of the discovery pattern file version currently used to their broadcast/multicast/unicast messages. A terminal device receiving information about a new discovery pattern file may contact the network element 102 or the server to download the new version.

a. The transmitted identifiers may pertain to the currently used discovery pattern files. Before receiving a new discovery pattern file, the network node may have to be more careful in driving, and may use more resources for discovery, as discovery may be based on outdated information. There may be a particular reserved discovery pattern that vehicles knowing that their discovery patterns are dated may use, as explained above.

b. When a new discovery pattern file becomes available, the new file has a validity date, after which it is used. In V2V transmissions, network nodes may indicate that they have a new discovery pattern file. In this way, information about a new file version may be virally spread in the vehicle population.

In an embodiment, the network element 102 transmits (e.g. broadcasts) the configuration information periodically. Periodicity may imply that the configuration information is transmitted in certain intervals, for example.

When discovery files are distributed in a periodic manner, the network element 102 or the server may periodically inform network nodes whether an update is available, or the vehicle periodically inquires the network element 102 or the server about an update. Such periodic informing or inquiry may initiated in a protocol, and realized by the lower layers of the communication stack whenever there is connectivity. If an update is available, an update procedure may be initiated. If a network node has not received update status information, or it has not been able to place an update inquire, at a time when it should have been done, the network node may inform other network nodes about it, using solutions as discussed above under point 3.

When discovery patterns are selected based on the geographical area, there may be certain discovery patterns that are reserved for streets, directions or lanes that are not specifically mentioned in the file. There may patterns that are used for groups of roads or lanes. There may, e.g., be one pattern that is used for all network nodes that are in all blind alley drive-ins to properties in an area, or two patterns for blind alleys, one when driving away from the main road, one when driving towards it.

Figure 5A:
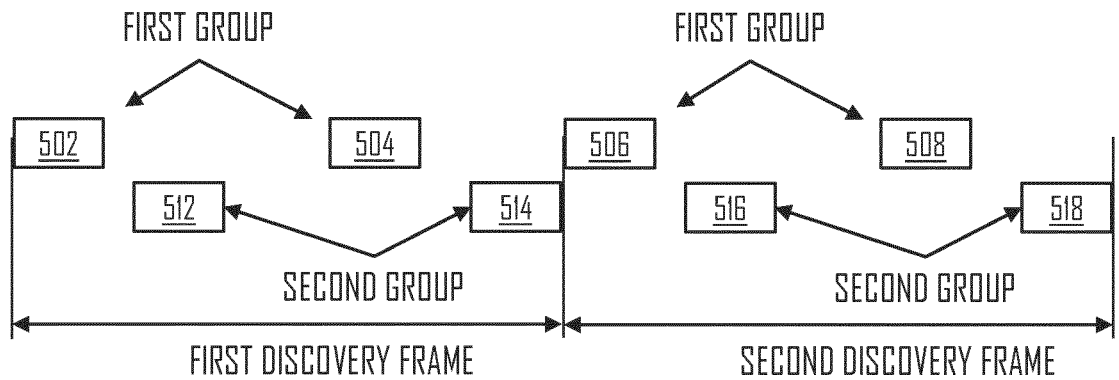
FIGS. 5A to 5B illustrate some embodiments.
Figure 5B:
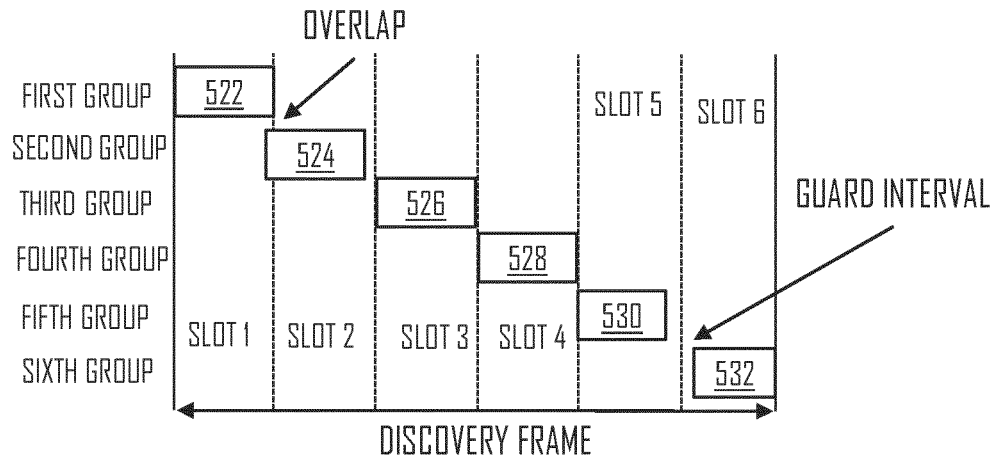

Let us now go deeper into the discovery pattern design. FIGS. 5A to 5B illustrate some embodiments. Referring to FIG. 5A, blocks 502, 504, 506, 508, 512, 514, 516, 518 may indicate discovery slots being part of discovery patterns. For example, the discovery slots 502-508 may be comprised in a first group of discovery patterns. For example, the discovery slots 512-518 may be comprised in a second group of discovery patterns. Although, two discovery frames are shown (first and second discovery frames) there may be only one discovery frame or more than two discovery frames also. Further, in the example of FIG. 5A there may be two discovery patterns, wherein the discovery patterns are both allocated to different groups (i.e. first and second groups).

For example, the discovery patterns may be periodic. The period of repetition may be referred to as a discovery frame, which is shown in FIG. 5A. In a discovery frame, there may be certain time instances, where a receiver may only be listening to discovery signal transmitted by other network nodes. These may be referred to as discovery slots. The time resources outside discovery slots may partially used for communication with discovered peers or network nodes, and umbrella network(s), and partially used for transmission of discovery signals, that may possibly be detected by other network nodes and further decoded. The umbrella network(s) may refer to the network in which the network element 102 is comprised in, for example. In an embodiment, the radio communication network described in relation to FIG. 1A is referred to as an umbrella network. That is, such umbrella network may comprise, for example, a cellular communication network and/or the V2V communication network. In an embodiment, the grouping, by the network element 102 is performed such that each discovery pattern in a group comprises at least one discovery slot that utilizes different radio resources compared with discovery slots of discovery patterns belonging to other groups of the at least two groups. Different radio resources may mean at least two things: different time resource and/or different frequency resource.

Looking at example of FIG. 5A, we can see that discovery slot 502 is situated such that it differs in time resources from the discovery slots 512-518 of another discovery pattern belonging to another group. Similar observation applies to discovery slot 512 compared with the slots 502-508. Thus, for example, if a discovery slot from the first group is given to a first network node and a discovery slot from the second group is given to a second network node, these nodes may be enabled to perform fast discovery.

The described solution on allocating or distributing the discovery patterns may be applicable to both synchronous and asynchronous V2V networks. As explained, the grouping is done such that network nodes using discovery patterns from different groups may discover each other rapidly. Further, network nodes using discovery patterns belonging to the same group may discover each other as well. One way to achieve this is that there is no resource (e.g. time and/or frequency) overlap within the discovery slot, or at least one resource for discovery signal transmission is not overlapped. The discovery patterns may be periodic, so that the pattern that a node follows, repeats, or it may be aperiodic, and based on e.g. a pseudo-random structure.

In an embodiment, the network element 102 synchronizes one or more network nodes to share a substantially exact notion of discovery frame timing. Network synchronization may be, for example, achieved by having a synchronized umbrella networks, e.g. a cellular network. The accuracy of synchronization may be subject to propagation time differences, processing delays, but with a discovery frame being long enough, solutions may cope with these non-idealities. An example on discovery groups is given, for example, in FIG. 5A.

In an embodiment, the network node 402 applies satellite signals (e.g. global navigation satellite system (GNSS)) for synchronization of discovery frames. For example, satellite signals may utilize Global Positioning System (GPS) or GLObal NAvigation Satellite System (GLONASS), to name two examples. Using, for example, GPS satellite signal input, a plurality network nodes may synchronize such that they share substantially the exact notion of discovery frame timing. For example, the discovery frames of different network nodes start substantially at the same time.

It needs to be understood that the discovery frame structure may be different for different groups or discovery patterns. For example, the frame duration may vary between groups. Referring to FIG. 5B, six groups of discovery patterns are illustrated each having the same discovery frame length. The discovery frame may extend over or comprise six slots (e.g. time slots) in the example of FIG. 5B. Each slot may be used as a potential discovery slot, for example. In the example of FIG. 5B, discovery slots 522-532 each belong to different discovery pattern, wherein each discovery pattern belongs to a different group. For example, the first discovery slot 522 may belong to a first discovery pattern belonging to the first group. The discovery patterns may be generated or used, by the network element 102, such that the discovery slots are at least partially using different radio resources. As shown, there may be some overlap between two discovery slots. Also there may be a specific guard interval between two subsequent slots.

The example of FIG. 5B may refer to Time Division Multiplexing (TDM), wherein it may be sufficient to determine resource groups, where cross-group discovery may be guaranteed. There may be overlaps between discovery slots that different nodes use for discovering others. Also, there may be guard intervals between possible discovery slots. One example of TDM grouping may be given in FIG. 5B, where there are six groups, with their respective TDM discovery slots.

In an example, according to FIG. 5B, all network nodes in the first group use the first slot (slot 1) for reception (i.e. discovery slot 522 is in the slot 1), whereas all other network nodes may transmit at least one discovery pattern or signal in the first slot. For the network nodes in the first slot to be able to discover each other, there may be an arrangement in slots 2-6, where a more involved pattern of transmitting and receiving is used, in certain resources received for discovery. A small fraction of the resources in slots 2-6 may be sacrificed to discovering other network nodes having discovery patterns allocated from the same group.

In an embodiment, each discovery frame comprises a plurality of slots (e.g. slots 1-6 of FIG. 5B), wherein at least one of the plurality of slots is configured as a discovery slot, and wherein rest of said slots are at least for the discovery signal transmission by the network node 402. For example, in such case there may be a different discovery frame for each group (e.g. six discovery frames). Thus, for example, the network node 402 may use slot 1 to detect discovery signals, and slots 2-6 at least to transmit discovery signal once or more. For example, during one slot (e.g. slot 2) the network node 402 may transmit discovery signal twice (e.g. once in the beginning and once in the end of the slot 2).

Figure 6A:
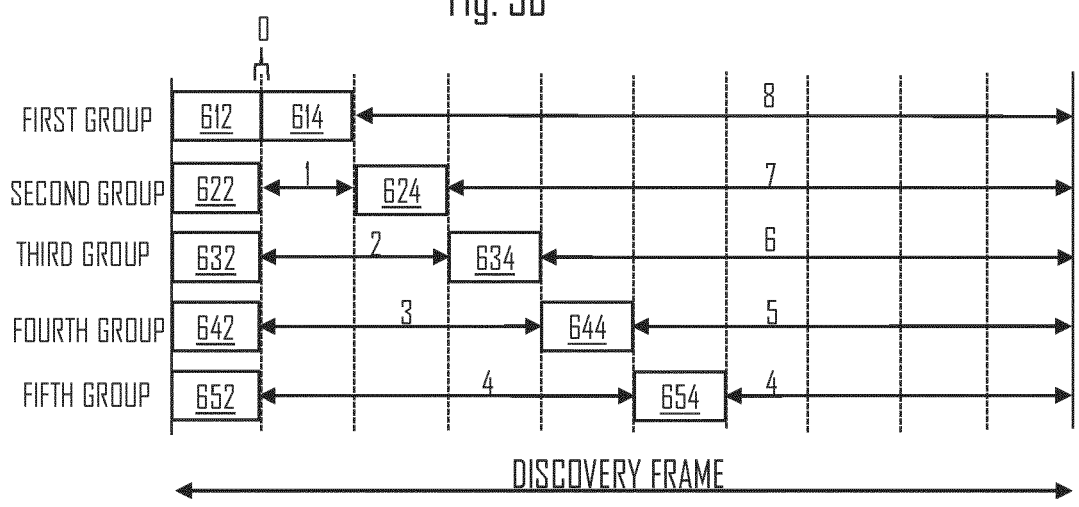
FIGS. 6A to 6B illustrate some embodiments.
Figure 6B:
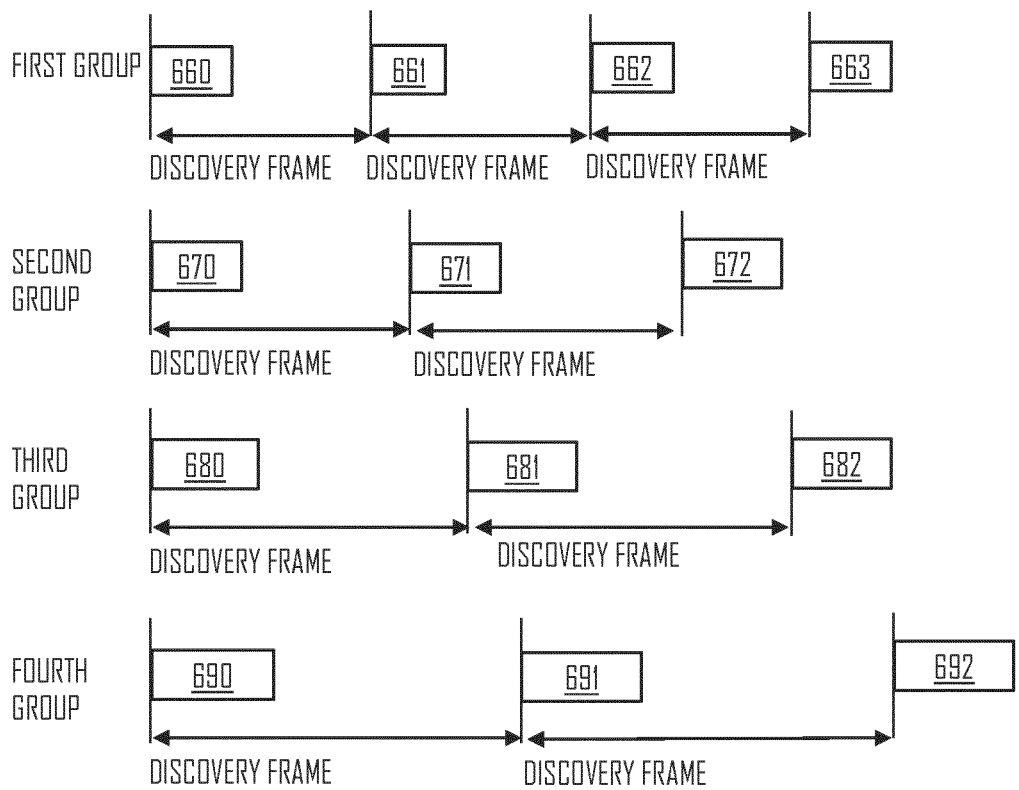

FIGS. 6A to 6B illustrate some embodiments. Referring to FIG. 6A, a time duration between two consecutive discovery slots may be discovery pattern-specific. For example, time duration between discovery slots 612, 614 of a discovery pattern belonging to first group may be different than for a discovery pattern (comprising discovery slots 622, 624) belonging to a second group. In the example of FIG. 6A, there may be one discovery pattern in each group. It may also be possible that there are more than one discovery pattern in one or more of the groups.

In an embodiment, the time duration between two consecutive discovery slots is group-specific. For example, if there are two discovery patterns in a first group, said time duration may be the same within the first group. However, if there is a second group comprising one or more discovery patterns, said time duration within the second group may be different compared with said time duration within the first group. That is, the group-specific time duration between two consecutive discovery slots may be the same for discovery patterns within the same group, but also different between groups.

FIGS. 6A to 6B may illustrate scenarios in which the discovery schema is asynchronous. In an asynchronous situation, the relative discovery frame timing may be arbitrary. Depending on the relative timing, different collisions are possible between different groups, as depicted in FIG. 6B. In an asynchronous setting, grouping principles may be more involved than in the synchronous case (e.g. examples in FIGS. 5A to 5B). As non-limiting examples of discovery frames that would work in an asynchronous setting, one may consider irregular slot intervals, and variable discovery frame length which are discussed here in more detail.

In a solution based on irregular slot intervals, there may be a fixed discovery frame length, and more than one discovery slots in the discovery frame. Examples of such is given FIG. 6A. The discovery slots 612-654 may be placed in the discovery frame with irregular intervals, so that no two groups may have the same pattern of irregularity, even up to cyclic permutations. An example where there are two discovery slots in a 10-slot discovery frame, is given in FIG. 6A.

Referring to FIG. 6A, there may be five discovery groups. Irrespective of the timing difference, network nodes belonging to different groups or having discovery patterns from different groups may find each other within a synchronization frame. If there is a partial collision of one of the discovery slots in the discovery frame, the next discovery slots may not collide. The discovery slot arrangements within the discovery frame may be characterized by two integers, which represent, for example, the number of normal slots between discovery slots. Here, the groups may have slot arrangements (0, 8); (1, 7); (2, 6); (3, 5); (4, 4), respectively. To go through one example, let us look at the discovery pattern in the third group. Said discovery pattern may comprise discovery slots 632, 634 within the illustrated discovery frame. Distance between the two discovery slots 632, 634 may be two (2) discovery frame slots. Distance between the discovery slot 634 and the next possible discovery slot in a next possible discovery frame may be six (6). Similar logic applies to all the groups and discovery patterns. Naturally, the described solution is not limited to specific number of groups or discovery patterns, and thus may be applied to number of different cases.

The irregular slot interval approach, as described in relation to FIG. 6A, may be generalized to any discovery frame length Nf, and any number Nd of discovery slots within a discovery frame. A distinct pattern may be characterized by a sequence of Nd integers which sum up to Nf-Nd, and which may not be cyclic permutations of each other. As an example, if there are three discovery slots (in a discovery slot) within a discovery frame of length 10, the discovery pattern for a group would be described by three non-negative integers, which sum to 7, and are not cyclic permutations of each other. These may be characterized by sequences (0, 0, 7); (0, 1, 6); (0, 2, 5); (0, 3, 4); (0, 4, 3); (0, 5, 2); (0, 6, 1); (1, 1, 5); (1, 2, 4); (1, 3, 3); (1, 4, 2); (2, 2, 3). There may thus be 11 discovery groups.

Still referring to FIG. 6A, the network nodes may be configured to transmit a discovery or a synchronization signal in each non-discovery slot. For example, a network node having a discovery frame from the first group should transmit the discovery signal in each slot that follows the discovery slot 614. In an embodiment, the network node is configured to transmit the discovery signal twice within a non-discovery slot. For example, once at the start portion of said non-discovery slot and once at the end portion of the non-discovery slot.

To discover network nodes belonging to the same group or having discovery patterns from the same group, a small fraction of the resources in the non-discovery slots may be used. The non-discovery slots may be subdivided into shorter sub-frames, and in part of these sub-frames, the network nodes may concentrate on receiving possible discovery and/or synchronization signals. Said subdividing may be performed by the network nodes, for example. Thus if each slot in the discovery frame would be divided into e.g. 10 sub-frames, the first and the last one may be used for transmitting synchronization or discovery signals. The network nodes may then have a pattern of transmitting and/or receiving intra-group discovery or synchronization signals in the 8 middle sub-frames. For example, referring to FIG. 6A, network nodes in the first group or having the discovery resources from the first group, may use a fraction of the 8 middle sub-frames in the non-discovery slots 3-10 for intra-group discovery. That is, those slots which are not used as discovery slots (e.g. 612, 614) for that specific group.

Referring to FIG. 6B, a solution based on variable discovery frame length may be shown. In the example, there may be four different groups, wherein the discovery frame length in each group may be different from each other. The discovery slots 660-692 may be arranged such that between discovery patterns (e.g. each group has one discovery pattern) there is at least one discovery slot that is not using same radio resources as the other slots 660-692. For example, the discovery slot 692 is not simultaneous with other discovery slots 660-691. More specifically, the discovery slot is not simultaneous with other discovery slots 660-682 belonging to other groups. Thus, the grouping may be performed, by the network element 102, such that at least one of the discovery slots, in a discovery pattern of a group, is not simultaneous with other discovery slots belonging to other groups. Also, in some embodiments, the grouping may be performed, by the network element 102, such that at least one of the discovery slots, in a discovery pattern of a group, is not simultaneous with discovery slots of at least one group. That is, for example, in FIG. 6B looking at the third group, the discovery slots 680, 681, 682 are arranged such that they are at least partially simultaneous with some discovery slots belonging to different groups. However, discovery slot 681 is not simultaneous with discovery slots of the first group as may be seen in the example of FIG. 6B. Further, the discovery slot 682 is not simultaneous with discovery slots of the second and fourth groups as may also be seen in the example of FIG. 6B. This may enable the network nodes (e.g. cars) to discovery each other using the four group example of FIG. 6B. As described, it may also be possible to use other configurations, e.g. such that the discovery frames are not synchronized (i.e. are asynchronous). In an embodiment, each discovery pattern comprises one or more discovery frames having the same duration, and wherein there are at least two discovery slots within each discovery frame. Example of this may be given in FIG. 5A, for example. Similarly, referring to FIG. 6A, there may be more than one discovery frame (although only one is illustrated). Further, in each discovery frame there may be more than one discovery slot.

In an embodiment, wherein each discovery pattern comprises one or more discovery frames having a discovery pattern specific duration, wherein there is at least one discovery slot within each discovery frame. Example of this is given in FIG. 6B, wherein the discovery frames are discovery pattern-specific. In an embodiment, the discovery frames are group-specific. For example, if there are more than one discovery pattern in one group, the discovery patterns may utilize the same discovery frame structure.

In an embodiment, as explained in the example above, each discovery pattern further comprises radio resources for discovery signal transmission by a network node (e.g. network node 402). One further example of this may be in FIG. 6B, wherein there may be radio resources for the transmission between the discovery slots. For example, between discovery slots 660, 661 there may be radio resources allocated for a network node for the transmission.

In an embodiment, each discovery frame comprises a plurality of slots, wherein at least two of the plurality of slots are configured as discovery slots, and wherein rest of said slots are at least for the discovery signal transmission by the network node. Example of this may be given in FIG. 6A as explained in detail above.

In an embodiment, the grouping, by the network element 102, is performed such that each discovery pattern in a group comprises radio resources for transmitting at least one discovery signal, at least some of said radio resources being different compared with radio resources for transmitting discovery signals comprised in discovery patterns belonging to other groups of the at least two groups. This may enable the network nodes to transmit the discovery signal at least once such that it may be detected by other network nodes without further interference.

Figure 7A:
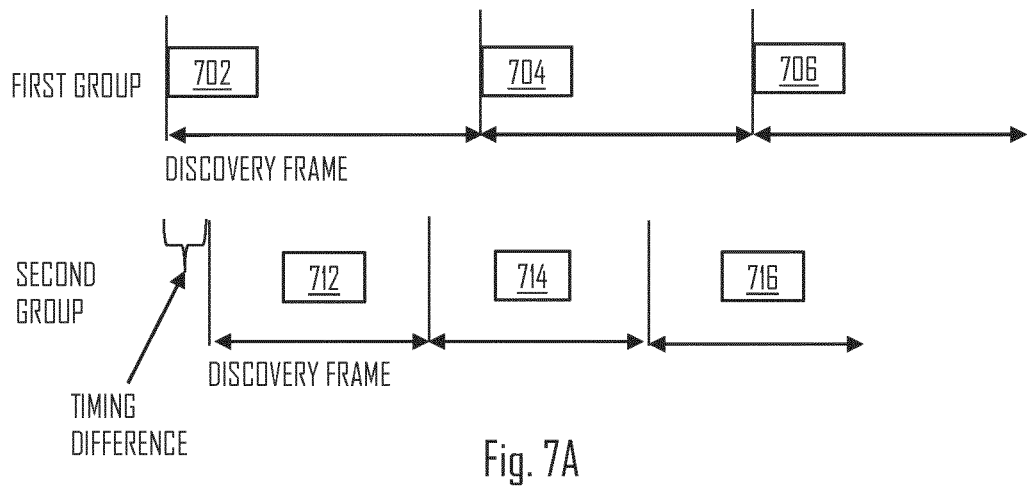
FIGS. 7A to 7B illustrate some embodiments.
Figure 7B:
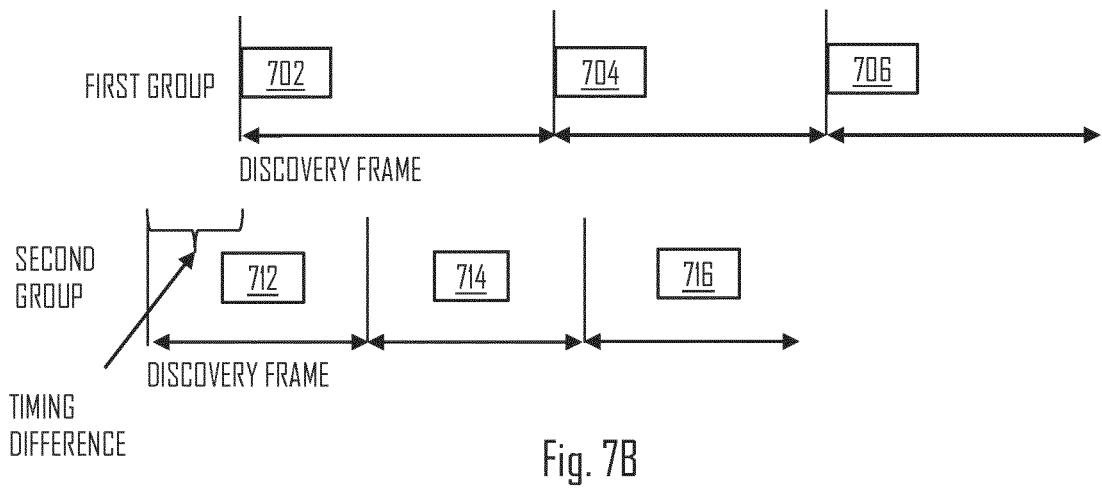

FIGS. 7A to 7B illustrate some embodiments. Referring to FIGS. 7A to 7B, the discovery frames of different groups (or different discovery patterns) may be of different length. There may also be timing difference between the different groups due to unideal transmission of signals (e.g. distance signal travels, propagation through air-interface). However, using the solution described with reference to FIG. 6B, the timing difference may be handled.

In an embodiment, referring to FIG. 6B, the discovery patterns are designed such that there is only one discovery slot in each discovery frame. This may save radio resources for further communication, but still enhance the discovery when more than one discovery frames are used.

Figure 8:
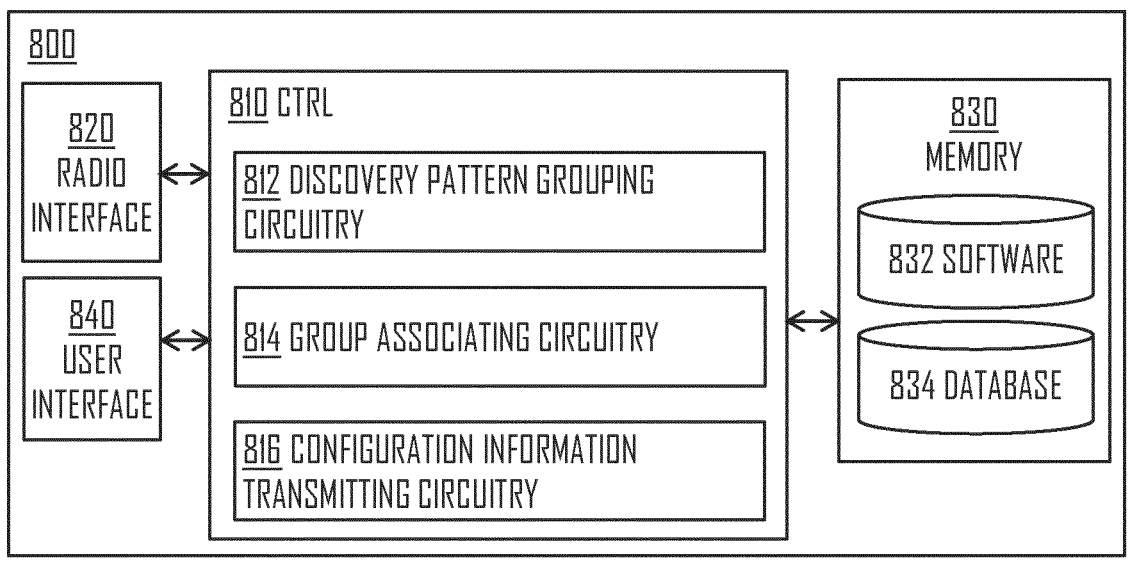
FIGS. 8 to 9 illustrate block diagrams of apparatuses according to some embodiments.
Figure 9:
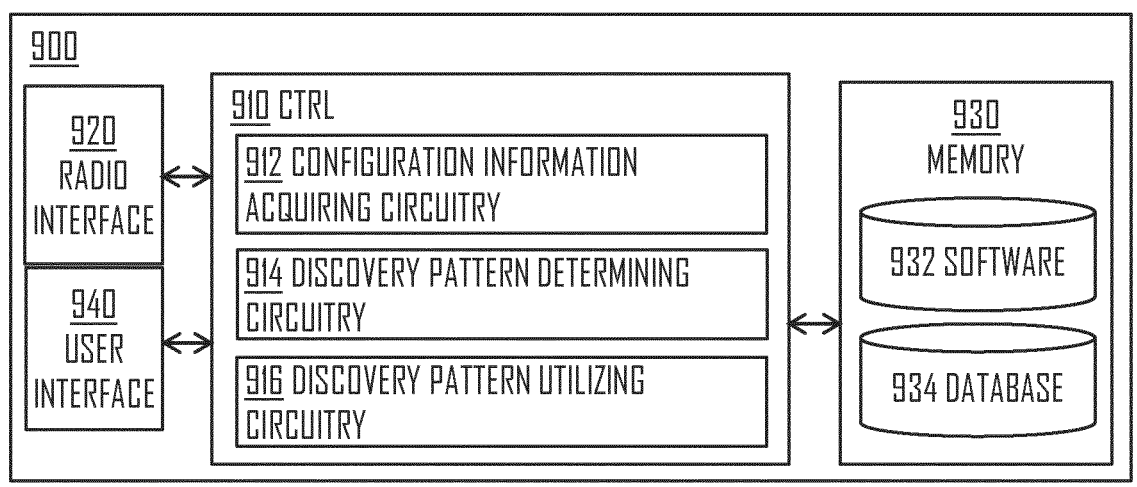

FIGS. 8 to 9 provide apparatuses 800, 900 comprising a control circuitry (CTRL) 810, 910, such as at least one processor, and at least one memory 830, 930 including a computer program code (software) 832, 932, wherein the at least one memory and the computer program code (software) 832, 932, are configured, with the at least one processor, to cause the respective apparatus 800, 900 to carry out any one of the embodiments of FIGS. 1A to 7B, or operations thereof.

Referring to FIGS. 8 to 9, the memory 830, 930, may be implemented using any suitable data storage technology, such as semiconductor based memory devices, flash memory, magnetic memory devices and systems, optical memory devices and systems, fixed memory and removable memory. The memory 830, 930 may comprise a database 834, 934 for storing data. For example, the transmitted and/or acquired configuration information may be stored in the memory 830, 930.

The apparatuses 800, 900 may further comprise radio interface (TRX) 820, 920 comprising hardware and/or software for realizing communication connectivity according to one or more communication protocols. The TRX may provide the apparatus with communication capabilities to access the radio access network, for example. The TRX may comprise standard well-known components such as an amplifier, filter, frequency-converter, (de)modulator, and encoder/decoder circuitries and one or more antennas. For example, the TRX may enable communication between the network node 402 and the network element 102. For example, the TRX may comprise a unit for providing cellular communication capabilities (e.g. 3G, 4G, 5G communication) and/or V2V communication capabilities. In an embodiment, said units are separate. In an embodiment, said units are comprised in one entity.

The apparatuses 800, 900 may comprise user interface 840, 940 comprising, for example, at least one keypad, a microphone, a touch display, a display, a speaker, etc. The user interface 840, 940 may be used to control the respective apparatus by a user of the apparatus 800, 900.

In an embodiment, the apparatus 800 may be or be comprised in a base station (also called a base transceiver station, a Node B, a radio network controller, or an evolved Node B, for example). The apparatus 800 may be the network element 102, for example. Further, the apparatus 800 may be the network element performing the steps of FIG. 2. In an embodiment, the apparatus 800 is comprised in the network element 102. For example, the apparatus 800 may cause the network element 102 to perform operations according to any one of the embodiments. In an embodiment, the apparatus 800 is or is comprised in a central unit of a V2V communication network.

Referring to FIG. 8, the control circuitry 810 may comprise a discovery pattern grouping circuitry 812 configured to group a plurality of discovery patterns into at least two groups, wherein each discovery pattern comprises one or more discovery slots on radio resources for detecting discovery signals by a network node; a group associating circuitry 814 configured to associate at least one of the groups with a first spatial parameter and at least one other group with a second spatial parameter; and a configuration information transmitting circuitry 816 configured to transmit configuration information enabling a network node to utilize a discovery pattern belonging to a group associated with a spatial parameter that corresponds to spatial information of the network node.

In an embodiment, the apparatus 900 may be or be comprised in a terminal device, such as a vehicle system, vehicle, mobile phone or cellular phone, for example. The apparatus 900 may be the network node 402, for example. In an embodiment, the apparatus 900 is comprised in the network node 402 or in some other network node. For example, the apparatus 900 may cause the network node 402 to perform operations according to any one of the embodiments.

Referring to FIG. 9, the control circuitry 910 may comprise a configuration information acquiring circuitry 912 configured to acquire discovery pattern configuration information; a discovery pattern determining circuitry 914 configured to determine, at least partly on the basis of the acquired configuration information, a discovery pattern associated with a spatial parameter that corresponds to spatial information of a network node: and a discovery pattern utilizing circuitry 916 configured to utilize the determined discovery pattern. For example, the configuration information may be received from the network element 102.

In an embodiment of FIG. 8, at least some of the functionalities of the apparatus 800 (e.g. the network element 102) may be shared between two physically separate devices, forming one operational entity. Therefore, the apparatus may be considered to depict the operational entity comprising one or more physically separate devices for executing at least some of the above-described processes. Thus, the apparatus of FIG. 8, utilizing such a shared architecture, may comprise a remote control unit (RCU), such as a host computer or a server computer, operatively coupled (e.g. via a wireless or wired network) to a remote radio head (RRH) located at a base station site. In an embodiment, at least some of the described processes of the network element may be performed by the RCU. In an embodiment, the execution of at least some of the described processes may be shared among the RRH and the RCU. In such a context, the RCU may comprise the components illustrated in FIG. 8, and the radio interface 820 may provide the RCU with the connection to the RRH. The RRH may then comprise radio frequency signal processing circuitries and antennas, for example.

In an embodiment, the RCU may generate a virtual network through which the RCU communicates with the RRH. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (i.e. to the RCU). External network virtualization is targeted to optimized network sharing. Another category is internal virtual networking which provides network-like functionality to the software containers on a single system. Virtual networking may also be used for testing the terminal device.

In an embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 2 to 7B may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 2 to 7B or operations thereof.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments of FIGS. 2 to 7B, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 2 to 7B may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method in a network element of a radio communication network, the method comprising:
  grouping, by the network element, a plurality of discovery patterns into at least two groups, wherein each discovery pattern comprises one or more discovery slots on radio resources for detecting discovery signals by a network node;
  associating at least one of the groups with a first spatial parameter and at least one other group with a second spatial parameter; and
  transmitting configuration information enabling a network node to utilize a discovery pattern belonging to a group associated with a spatial parameter that corresponds to spatial information of the network node.

2. The method of claim 1, wherein the spatial parameters comprise at least one of a geographical area, network node location, network node moving direction.

3. The method of claim 1, wherein the grouping is performed such that each discovery pattern in a group comprises at least one discovery slot that utilizes different radio resources compared with discovery slots of discovery patterns belonging to other groups of the at least two groups.

4. The method of claim 1, wherein a time duration between two consecutive discovery slots is discovery pattern-specific.

5. The method of claim 1, comprising at least one of:
  wherein each discovery pattern comprises one or more discovery frames having the same duration, and wherein there are at least two discovery slots within each discovery frame; and
  wherein each discovery pattern comprises one or more discovery frames having a discovery pattern specific duration, and wherein there is at least one discovery slot within each discovery frame.

6. The method of claim 1, wherein each discovery pattern further comprises radio resources for discovery signal transmission by a network node.

7. The method of claim 6, wherein each discovery frame comprises a plurality of slots, wherein at least two of the plurality of slots are configured as discovery slots, and wherein rest of said slots are at least for the discovery signal transmission by the network node.

8. The method of claim 6, wherein the grouping is performed such that each discovery pattern in a group comprises radio resources for transmitting at least one discovery signal, at least some of said radio resources being different compared with radio resources for transmitting discovery signals comprised in discovery patterns belonging to other groups of the at least two groups.

9. The method of claim 1, wherein the configuration information comprises an allocation of a discovery pattern or an indication of a group.

10. The method of claim 1, further comprising:
  receiving from a network node a message requesting radio resources for discovery signal transmission and/or receiving; and
  determining, based on the received message, a group associated with a spatial parameter that corresponds to spatial information of said network node,
  wherein the transmitting the configuration information comprises allocating a discovery pattern of said group to the network node.

11. The method of claim 10, wherein the message transmitted by a network node requesting radio resources for discovery signal transmission and/or receiving further indicates spatial information of the network node.

12. A computer program product embodied on a computer-readable medium and comprising a computer program code readable by a computer, wherein the computer program code configures the computer to carry out the method according to claim 1 when read by the computer.

13. A method for device discovery in a network node, the method comprising:
- acquiring, by the network node, discovery pattern configuration information enabling the network node to utilize a discovery pattern belonging to a group associated with a spatial parameter that corresponds to spatial information of the network node;
- determining, at least partly based on the acquired configuration information, the discovery pattern associated with the spatial parameter that corresponds to the spatial information of the network node; and
- utilizing the determined discovery pattern associated with the spatial parameter that corresponds to spatial information of the network node.

14. The method of claim 13, further comprising:
- transmitting, to a network element of a radio communication network, a message requesting radio resources for discovery signal transmission and/or receiving, wherein the message comprises the spatial information of the network node; and
- receiving the configuration information as a response to the transmitting.

15. The method of claim 13, wherein the configuration information comprises allocation of the discovery pattern to the network node.

16. The method of claim 13, further comprising:
- determining that the discovery pattern is outdated; and
- as a response, performing a predetermined action.

17. A computer program product embodied on a computer-readable medium and comprising a computer program code readable by a computer, wherein the computer program code configures the computer to carry out the method according to claim 13 when read by the computer.

18. The method of claim 13, wherein the spatial information of the network node includes at least one of a direction of movement of the network node or a speed of the network node.

19. An apparatus comprising:
- at least one processor, and
- at least one memory comprising a computer program code, wherein the at least one memory and the computer program code are configured, with the at least one processor, to cause a network element of a radio communication network to perform operations comprising:
  - grouping a plurality of discovery patterns into at least two groups, wherein each discovery pattern comprises one or more discovery slots on radio resources for detecting discovery signals by a network node;
  - associating at least one of the groups with a first spatial parameter and at least one other group with a second spatial parameter; and
  - transmitting configuration information enabling a network node to utilize a discovery pattern belonging to a group associated with a spatial parameter that corresponds to spatial information of the network node.

20. An apparatus comprising:
- at least one processor, and
- at least one memory comprising a computer program code, wherein the at least one memory and the computer program code are configured, with the at least one processor, to cause a network node to perform operations comprising:
  - acquiring discovery pattern configuration information enabling the network node to utilize a discovery pattern belonging to a group associated with a spatial parameter that corresponds to spatial information of the network node;
  - determining, at least partly based on the acquired configuration information, the discovery pattern associated with the spatial parameter that corresponds to the spatial information of the network node; and
  - utilizing the determined discovery pattern associated with the spatial parameter that corresponds to spatial information of the network node.

* * * * *